United States Patent [19]

Abdul et al.

[11] Patent Number: 5,577,558

[45] Date of Patent: Nov. 26, 1996

[54] IN-WELL DEVICE FOR IN SITU REMOVAL OF UNDERGROUND CONTAMINANTS

[75] Inventors: Abdul S. Abdul, Troy; Thomas L. Gibson, Utica, both of Mich.

[73] Assignee: General Motors Corporation, Detroit, Mich.

[21] Appl. No.: 543,582

[22] Filed: Oct. 16, 1995

[51] Int. Cl.⁶ .............................. B09C 1/10; E21B 43/12
[52] U.S. Cl. ................ 166/246; 166/106; 166/250.01; 166/370; 166/371; 210/170; 210/205; 210/617; 210/747; 405/128
[58] Field of Search ................................. 166/106, 107, 166/246, 265, 310, 250.01, 370, 371; 405/128; 210/96.1, 149, 170, 205, 617, 747

[56] References Cited

U.S. PATENT DOCUMENTS

| | | | |
|---|---|---|---|
| 4,981,393 | 1/1991 | Van De Velde et al. | 405/128 |
| 5,116,163 | 5/1992 | Bernhardt | 210/170 X |
| 5,171,104 | 12/1992 | Bernhardt | 210/170 X |
| 5,190,405 | 3/1993 | Vinegar et al. | 405/128 |
| 5,220,958 | 6/1993 | Bernhardt | 166/370 X |
| 5,302,286 | 4/1994 | Semprini et al. | 166/370 X |
| 5,318,698 | 6/1994 | Bernhardt | 210/170 X |
| 5,387,057 | 2/1995 | De Loach | 166/370 X |
| 5,398,757 | 3/1995 | Corte et al. | 166/370 X |

*Primary Examiner*—George A. Suchfield
*Attorney, Agent, or Firm*—George A. Grove

[57] ABSTRACT

A method and apparatus for achieving in situ bioremediation of volatile contaminants in the vapor phase and dissolved or dispersed contaminants in the groundwater phase at a contaminated site. The apparatus of this invention is configured to be used within a remediation well of the type employed with vapor extraction and dewatering techniques, and serves to biologically treat soil contaminants in situ with microbes and any suitable microbial nutrients. As such, the present invention is adapted to be employed in conjunction with vapor extraction and dewatering remediation techniques to treat vapor and water-borne contaminants more effectively. The apparatus securely retains the microbes in a manner that serves to prevent leaching into the surrounding soil while simultaneously protecting the microbial population from predatory, competitive and inhibitory microorganisms.

20 Claims, 2 Drawing Sheets

IN-WELL DEVICE FOR IN SITU REMOVAL OF UNDERGROUND CONTAMINANTS

The present invention generally relates to an apparatus for in situ removal of volatile contaminants in the vapor phase and dissolved or dispersed contaminants in the groundwater phase at a contaminated site. More particularly, this invention relates to such an apparatus and a bioremediation method made possible by the apparatus, wherein contaminants are treated biologically by the apparatus when installed within a well adapted to operate by vapor extraction or dewatering remediation techniques, such that the apparatus is adapted to be operated in conjunction with vapor extraction and dewatering techniques to treat vapor and water-borne contaminants more effectively.

BACKGROUND OF THE INVENTION

In view of the vital environmental implications, there is a continuing effort to identify and clean up sites contaminated with hazardous substances, with various methods and equipment having been proposed for this purpose. In the past, one known method has been to remove the contaminated soil and dispose of it elsewhere. However, the practical and remedial shortcomings of this approach are apparent, such that various other methods and equipment have been proposed to remediate such sites by physically removing the contaminants from the soil.

Soil vapor extraction (VE) is one such technique known in the art as an effective process for the removal of volatile organic contaminants (VOCs), such as gasoline, from unsaturated subsurface soils. This process generally entails the use of one or more wells formed in the contaminated soil to be remediated, with each well being connected to a blower to draw air through the soil and vaporize the VOCs. The VOCs must then be accumulated aboveground for treatment so as not to discharge the VOCs directly into the atmosphere. A benefit of the forced air flow through the contaminated soil is that oxygen is made available to any soil and groundwater aerobic microorganisms present in the soil that are capable of biodegrading hydrocarbon contaminants in situ. In effect, ensuring an adequate oxygen supply through forced aeration of the soil, termed "bioventing" (BV), significantly enhances biodegradation in the unsaturated soil zone. However, circumstances are typically such that a majority of the contaminants present within the soil must be removed and treated aboveground as described previously.

A technique for removing contaminants from a saturated soil zone is known as dewatering (DW) and is accomplished by directly pumping groundwater from a well that extends into the saturated soil zone. Dewatering serves to remove dispersed and dissolved organic contaminants in the pumped groundwater and significantly enhances soil remediation when used in combination with both vapor extraction and bioventing processes. Injecting air beneath the soil's water table, a technique referred to as "air sparging," serves to strip dissolved VOCs from the groundwater, which can then be captured by a vapor extraction system. Sparging is often termed "biosparging (BSp)" when the additional oxygen supply enhances biodegradation in the saturated soil zone. For more effectively removing VOCs from soil, well systems have been proposed that combine these processes simultaneously—vapor extraction, bioventing, biosparging and dewatering.

Though the above techniques are widely practiced in one form or another to remediate contaminated soil, each is associated with certain complications, disadvantages and shortcomings. For example, the emission of vapor phase contaminants from a vapor extraction system presents a serious regulatory problem, and the resulting requirement for appropriate treatment equipment greatly increases the cost of site cleanup. In particular, VOCs stripped from soil by a vapor extraction system become entrained in the air flowing into one of the system's remediation wells and, because VOCs are a hazardous waste, cannot be discharged into the atmosphere under state and federal regulations. Therefore, the VOC-containing air drawn into the well must be monitored and routed to an aboveground waste treatment system, such as an activated carbon absorption system or a thermal destruction unit (TDU), where the VOCs are absorbed or burned to prevent their emission into the atmosphere. While such techniques are capable of effectively eliminating VOCs as a hazardous waste of the remediation process, considerable costs are initially incurred to buy and maintain these systems, including the replacement of the activated carbon and/or maintaining a sufficient temperature in a thermal destruction unit to burn the VOC vapors. Additional expenses are incurred for the preparation and issuance of discharge permits for vapor extraction systems. Furthermore, if an activated carbon absorption system is employed, the spent carbon presents an additional waste problem, thereby incurring significant costs for its handling and disposal.

Similar problems arise when dewatering techniques are employed to remediate contaminated soil. For example, the contaminated groundwater that accumulates in the wells must be pumped to an above ground treatment facility. As such, disadvantages noted for vapor extraction systems are also associated with dewatering systems, including the requirement for extensive treatment equipment and discharge permits for the treatment and eventual release of the treated groundwater.

To avoid or reduce the reliance on large aboveground treatment facilities necessitated by standard vapor extraction and dewatering techniques, biological remediation processes can be employed at contaminated sites to biodegrade contaminants in situ, thereby converting the contaminants within the soil to such byproducts as water and carbon dioxide. Bioremediation is a particularly attractive approach to remediating contaminated sites, because the contaminants at most cleanup sites are often volatile, biodegradable organic substances. Furthermore, water-soluble, biodegradable organic contaminants are often the cause of groundwater contamination sites. As such, bioremediation is a possible remediation technique at these sites to eliminate the offending contaminants in situ.

Though the byproducts of a bioremediation process are environmentally safe, certain environmental regulations exist that can delay and even prevent the implementation of biological remediation technologies. Most notably, permits must be obtained before microbes, especially microbes from other sites and genetically-engineered microbes, and beneficial nutrient chemicals can be released into the subsurface soil. Biodegradation of soil contaminants is possible at some sites by using native microorganisms already growing in the soil and groundwater which have adapted to degrade the contaminants. However, at many sites the contaminants or site conditions require the use of other microbes cultured in the laboratory and chemical supplements, including sources of oxygen, oxidation agents, or other electron acceptors and chemical nutrients. Furthermore, even where a beneficial microbial population is present, an adequate population may not be sustainable if predatory, competitive, or inhibitory microorganisms also exist in the contaminated soil.

From the above, it can be appreciated that in situ biological treatment of contaminated sites is a highly desirable remediation technique, but at the present is not practical or feasible under circumstances where adequate microbial activity is not already present. Accordingly, it would be desirable to provide a method for promoting bioremediation of contaminated soil, wherein enhanced microbial activity can be achieved without reliance on directly introducing microbes and nutrients into the soil to be remediated.

SUMMARY OF THE INVENTION

It is an object of this invention to provide a biological treatment capability to vapor and groundwater remediation techniques employed to treat volatile, dissolved, and dispersed organic contaminants in subsurface soil.

It is a further object of this invention that such a capability is made possible with an apparatus that is deployed within contaminated subsurface soil regions, so as to minimize the requirement for aboveground treatment equipment.

It is another object of this invention that the apparatus is a biotreatment reactor adapted for use within a vapor extraction or dewatering remediation well, wherein the reactor is adapted to eliminate problems encountered in the prior art when using microbial bioremediation techniques in subsurface soil regions.

It is yet another object of this invention that such a reactor has features that enable optimization of conditions for biodegradation of contaminants within the reactor, including the ability to directly add microbes and other beneficial materials to the reactor, to retain the microbes and beneficial materials within the reactor so as to prevent their release to the surrounding soil, and to protect the microbial population in the reactor from predatory, competitive, or inhibitory microorganisms.

In accordance with a preferred embodiment of this invention, these and other objects and advantages are accomplished as follows.

According to the present invention, there are provided a method and apparatus for achieving in situ bioremediation of volatile contaminants in the vapor phase and dissolved or dispersed contaminants in the groundwater phase at a contaminated site. The apparatus of this invention is configured to be used within a remediation well of the type employed with vapor extraction and dewatering techniques, and serves to biologically treat soil contaminants in situ with microbes and any suitable microbial nutrients. As such, the present invention is adapted to be employed in conjunction with vapor extraction and dewatering remediation systems to treat vapor and water-borne contaminants more effectively. Importantly, the apparatus also securely retains the microbes in a manner that serves to prevent their leaching into the surrounding soil, while simultaneously protecting the microbial population from predatory, competitive and inhibitory microorganisms.

As noted above, the apparatus of this invention generally requires a well that is sufficiently deep to extend into the contaminated subsurface region intended to be remediated. The lower end of the well is adapted to permit entry of a fluid in the subsurface region into the well. Depending on the type of remediation to be performed, this fluid may be a liquid within a saturated soil region in which a contaminant is dissolved or dispersed. Alternatively, the fluid may be in the vapor phase in which a volatile contaminant is present and dispersed in an unsaturated region of soil. Finally, it is foreseeable that multiple contaminants may be present in the liquid and vapor phases. Depending on the form of the contaminant, a vapor extraction or dewatering technique may be employed to transport the subject contaminant or contaminants from the soil and into the well.

According to this invention, a reactor is disposed in the well above the fluid point of entry. The reactor includes a porous mass that is pervious to the fluid and in which microbes capable of biodegrading the contaminant are dispersed and physically retained so as to inhibit the microbes from exiting the reactor. For this purpose, the matrix formed by the porous mass must provide passages sufficiently large to permit contaminants and water to move freely therethrough, while being sufficiently small to entrap the microbes within the porous mass. Furthermore, the reactor and the well preferably cooperate to ensure that the fluid drawn into the well must pass through the reactor. Finally, the well is equipped with a pumping device that serves to draw the bioremediation byproducts—namely, clean air and water—from the reactor, and also a device capable of introducing microbes into the reactor from the aboveground surface.

From the above description, it can be seen that the apparatus of this invention makes possible a novel method for removing contaminants from a subsurface region of the earth. Generally, the method entails the steps of providing a suitable well, preparing the reactor with an appropriate level and species of microbes within the porous mass, and then installing and operating the apparatus such that vapors or liquids within the soil flow through the reactor for biological treatment. In doing so, contaminants within the vapor or liquid are biodegraded to produce clean air and water that can be continuously removed from the reactor and safely discharged to the atmosphere. Furthermore, the apparatus is operated to maintain a healthy microbial population within the reactor by introducing additional microbes and/or other beneficial substances into the reactor from the aboveground surface.

A significant advantage of this invention is that a highly practical in situ treatment method is provided by which contaminated sites can be fully bioremediated. As such, air and groundwater treatment permits required to perform conventional vapor extraction and dewatering remediation techniques are unnecessary. Furthermore, the invention enables an increased accessibility and use of surface areas above the contamination site by avoiding the requirement for the aboveground treatment equipment required by conventional vapor extraction and dewatering remediation techniques. Such advantages significantly minimize the cost to remediate a contaminated site as a result of lower capital investment and maintenance costs.

In addition to the above, a further advantage is that the practice of this invention yields a bioremediation process characterized by improved control and efficiency. For example, the present invention is not limited to the microbial species and population already present in the contaminated soil, but permits the selective introduction of additional microbes, as well as the use of different microbe species including genetically-engineered microbes, such that the biodegradation process can be optimized for the particular soil, contaminants and environmental conditions. Because a microbial population utilized within the apparatus of this invention is physically restrained within the reactor, environmental restrictions pertaining to the introduction of microbes into the earth are not applicable. Furthermore, the reactor serves to protect and nurture the microbial population so as to further optimize the bioremediation process. For example, the apparatus is adapted to permit nutrients to be provided directly to the microbe population, while simultaneously protecting the population from predatory, competitive or inhibitory microorganisms.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
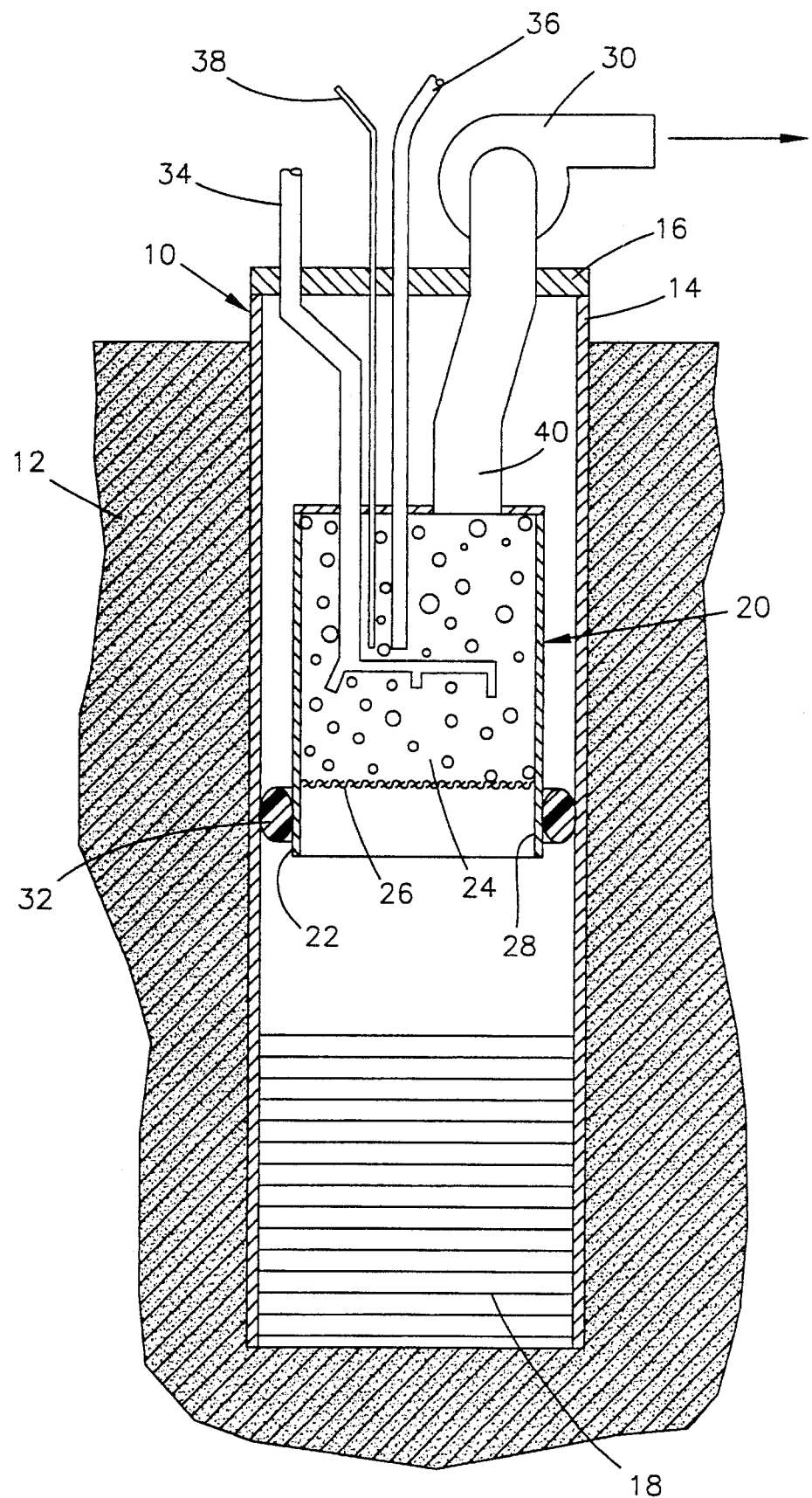
FIG. 1 shows in cross-section a well containing a biotreatment reactor for use in an unsaturated contaminated soil zone in accordance with a first embodiment of this invention.
Figure 2:
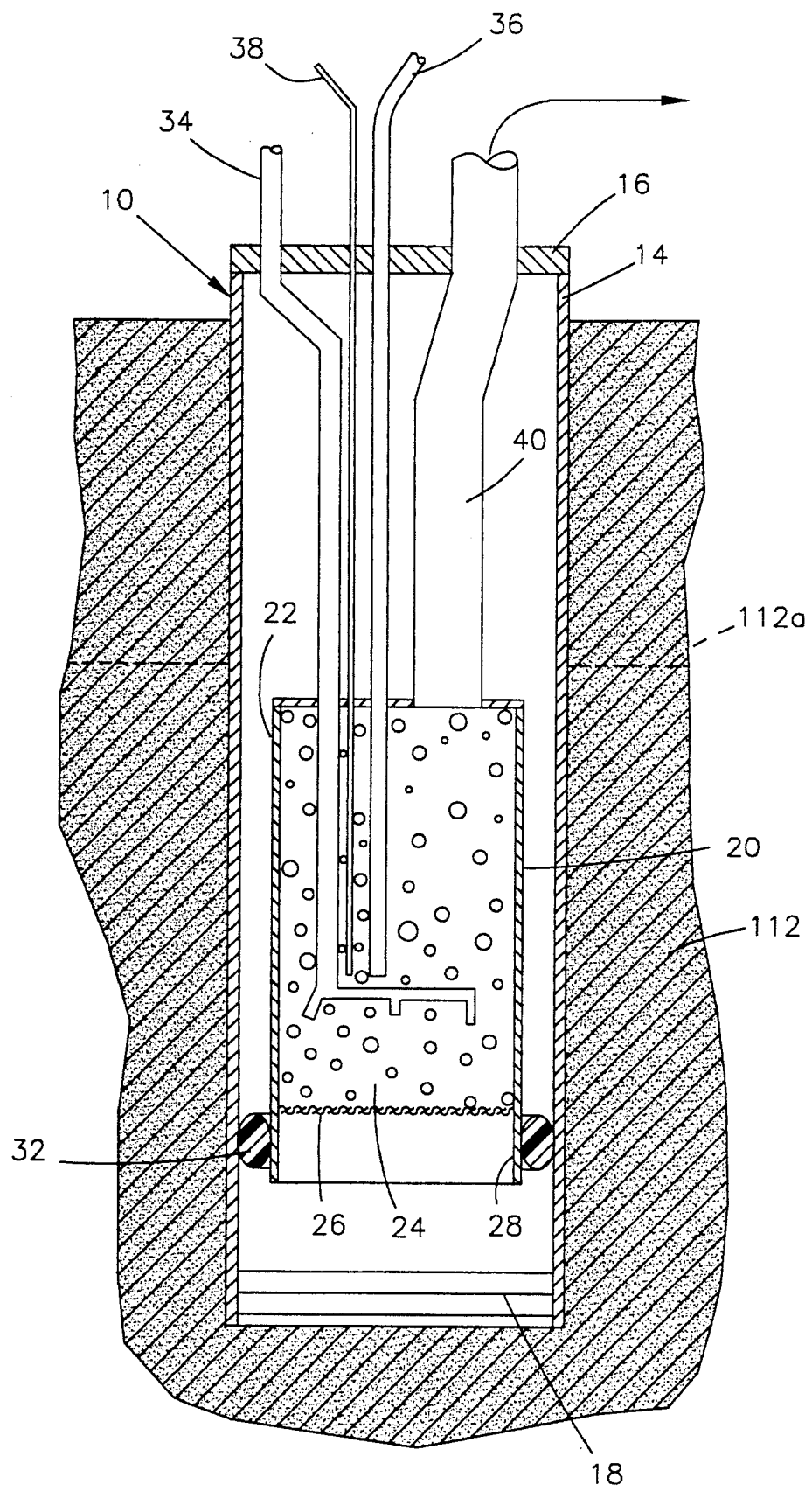
FIG. 2 shows in cross-section a well containing a biotreatment reactor for use in a saturated contaminated soil zone in accordance with a second embodiment of this invention.

Shown in FIGS. 1 and 2 are embodiments of an apparatus adapted to remove volatile and water-soluble biodegradable organic contaminants, respectively, from a subsurface soil region of a contamination site. The embodiments shown in the Figures generally have the same physical construction but are implemented differently in order to appropriately operate to remove a volatile or water-borne contaminant, as the case may be. While a preferred construction and configuration for each embodiment are depicted, those skilled in the art will recognize that other constructions and configurations could be employed which are all within the scope of this invention.

With reference to FIG. 1, a well 10 is depicted as being located in a soil region 12 that contains, but is not saturated with, a volatile biodegradable organic contaminant. As such, FIG. 1 represents an embodiment of the invention to be used to treat volatile organic contaminants (VOCs) that can be extracted from the unsaturated soil region 12 through the use of a known vapor extraction technique. The well 10 is shown to include a well casing 14 and a well head 16 that caps and seals the interior of the well casing 14 from the surface of the contamination site. As is known in the art, the well casing 14 can be of any suitable construction and diameter, with the depth of the well casing 14 being dependent on the location of the contamination region beneath the surface of the earth. The lower end of the well casing 14 is generally equipped with a screen 18 or other suitable structure capable of excluding soil and other relatively large solid particles from the well 10, while freely permitting entry of the vapor phase contaminants present in the soil region 12.

As shown in FIG. 1, the present invention utilizes a subsurface biotreatment reactor 20 within the well 10. As will become apparent, the reactor 20 serves to remove VOCs from the vapor stream immediately after it is drawn from the soil region 12 into the well 10, and before the vapor is discharged above ground. For this purpose, the reactor 20 is positioned between the screen 18 at the lower end of the well 10 and the well head 16 at the upper end of the well 10. The reactor 20 is generally composed of a cartridge 22 having a closed upper end, a vapor inlet 28 at the lower end of the cartridge 22, and a biofilter reactor bed 24 located above a filter 26 adjacent the vapor inlet 28. Generally, the filter 26 may be of any suitable type known in the art and capable of trapping solid particles that are sufficiently small to pass through the screen 18 and would, if not prevented, otherwise interfere with the operation of the reactor bed 24.

The reactor bed 24 is composed of a moist porous matrix in which a population of microbes is dispersed such that the VOCs absorbed by the bed 24 are biodegraded in situ. According to this invention, the porous matrix must be capable of absorbing the VOCs drawn from the soil region 12, and also capable of reliably retaining the microbes within the bed 24 in order to prevent their release to the environment. Based on these requirements, suitable materials for the bed 24 generally have a granular consistency, and include such materials as activated carbon, resins, sand, glass beads, filter materials or other suitable carrier material on which bacteria can grow and which yield a matrix capable of retaining aerobic microbes of types suitable for degrading biodegradable organic contaminants. Generally, the above-noted granular materials are each available in a form capable of retaining microbes having a diameter of more than about one micrometer.

In order to operate satisfactorily, a suitable population of microbes must be dispersed in the reactor bed 24. According to this invention, the microbes used in the reactor 20 may be native microbes cultured from the contaminated soil region 12, and therefore likely adapted to the prevailing site conditions and capable of rapidly degrading the contaminants present. Alternatively, natural microbes from a different site or genetically-engineered microbes that are known to successfully degrade the contaminant may be used. Notably, because the microbe population is retained within the cartridge 22, the present invention enables the use of "foreign" or genetically-altered microbes whose uncontrolled release within the soil region 12 for in situ bioremediation would ordinarily be heavily restricted by state and/or federal regulations. Thus, foreign microbes with capabilities especially well suited for the biodegradation of a particular contaminant can be safely used at a contamination site by being appropriately retained within the cartridge 22.

Another significant advantage of the cartridge 22 is that a very prominent cause of failure in bioremediation processes is attributable to microbeinhibiting influences present within the soil region 12, including the soil's organic and inorganic chemistry and the presence of other natural organisms that are predatory or compete with the desired microbe species. The detrimental effects that such circumstantial factors may cause are prevented by maintaining the population of microbes in the protective environment of the cartridge 22, in which the filter 26 and the bed 24 are adapted to exclude other microorganisms and nonliving biomass.

As shown, the reactor 20 is positioned in the well casing 14 and connected in such a way that vapor entering the well casing 14 is drawn through the screen 18 from the soil region 12, and then passes through the reactor bed 24 before being vented through the well head 16 at the upper end of the well 10. While various equipment can be used to create the flow pattern through the well casing 14, a suitable device is a conventional blower 30 interconnected to the cartridge 22 by an outlet pipe 40, as represented in FIG. 1. To ensure that essentially all of the vapor drawn from the soil region 12 is biodegraded within the bed 24, a suitable seal 32 such as an inflatable bladder is preferably disposed between the outer diameter of the cartridge 22 and the interior wall surface of the well casing 14.

As illustrated, the reactor 20 of this invention is adapted to promote the effectiveness of the biodegradation process through the introduction of additional microbe cultures into the bed 24, and through monitoring the condition of the microbe population within the bed 24. For purposes of the former capability, an injector 34 is preferably provided through which substances beneficial to the biodegradation process can be introduced directly into the bed 24 from the surface above the soil region 12, such that the cartridge 22 need not be disturbed once in place. Substances suitable for direct introduction into the bed 24 include microbial inoculum, nutrients such as nitrogen and phosphorous sources, trace metals, vitamins in gaseous or liquid forms that improve biological degradation rates, moisture in the form of water, and oxygen or other electron acceptors.

Preferably, the injection line 34 is connected to an injection system (not shown) in order to permit the introduction of beneficial substances to the bed 24 at appropriately controlled rates. For this purpose, a sample line 36 is preferably present to enable the condition of the microbe population within the cartridge 22 to be monitored through the taking of samples from the bed 24 for later analysis in an aboveground laboratory. As such, the injection rate of additives through the injection line 34 can be appropriately adjusted for the prevailing conditions within the cartridge 22. Furthermore, the sample line 36 can be employed to continuously monitor the microbial environment of the bed 24 by the use of appropriate sensors in order to further promote the effectiveness of the biodegradation process. For example, the sample line 36 can be coupled with monitoring and control systems at the surface to measure the concentrations of moisture (humidity), oxygen, VOCs, nutrients and chemicals within the microbial environment of the bed 24. The addition of beneficial materials to the reactor bed 24 can then be continuously controlled and metered according to these measurements by an automated system (not shown). Finally, the reactor 20 is shown as preferably including a thermometer or thermostat 38 installed in the reactor bed 24 and connected to a temperature control device and heater (not shown) in the bed 24 to operate the reactor 20 at an optimum temperature for biodegradation.

It is an important feature of the invention that the beneficial additives described above are not injected or released into the soil. As such, regulatory requirements for permits to inject such beneficial materials and nutrients are generally inapplicable to the practice of this invention, though posing a severe limitation for other prior art bioremediation systems. As such, the present invention avoids the potential environmental effects of direct soil injections while retaining the desired benefit of such additives. Further, the present invention avoids the inherent delays and permit fees entailed in obtaining a permit to release foreign microbes and certain microbial nutrients within natural media.

In use, this invention enables optimal remediation conditions to be attained at a contamination site by the use of a number of reactors 20 of the type shown in FIG. 1, each being appropriately positioned to form an array (well field) of vapor extraction or combination vapor extraction-dewatering wells installed in the contaminated site. The operation of a reactor 20 of this invention for use with a vapor extraction technique would be generally as follows. A suitable well 10 would be formed in any suitable manner, with care being taken to ensure that the reactor 20 can be received within the well casing 14. The reactor 20 is then prepared by filling the cartridge 22 with an appropriate level and species of microbes within a suitable amount of porous matrix material to form the reactor bed 24. With the filter 26 properly positioned in the vapor inlet 28, the reactor 20 is then positioned within the well casing 14 as indicated in FIG. 1. In cooperation with other and conventional vapor extraction equipment known in the art, the reactor 20 is operated in a manner to draw volatile contaminants within the soil region 12 through the reactor bed 24 where they are biodegraded to form water and carbon dioxide. Thereafter, these byproducts are evacuated from the cartridge 22 through the outlet pipe 40 and subsequently released to the surrounding atmosphere.

Throughout its operation, the reactor 20 is operated to maintain a healthy microbial population by introducing additional microbes and/or other useful substances into the reactor 20 from the surface. The operation of each reactor 20 used at a contamination site can be further controlled such that the biodegradation conditions within each reactor 20 are adjusted to remove VOCs in the most cost effective manner, such that emissions of harmful vapors and contaminated liquids are eliminated.

As an alternative to the above-described scenario, the fluid to be removed from a contamination site may be a liquid within a saturated soil region, in which one or more contaminants are dissolved or dispersed. It is also foreseeable that multiple contaminants may be present in the liquid and vapor phases. As represented in FIG. 2, the apparatus of this invention can be adapted with minor modifications to perform equally well under such circumstances, in which a dewatering technique, alone or in combination with a vapor extraction, is necessitated by a saturated soil condition. As indicated by FIG. 2, soil dewatering techniques generally entail pumping groundwater containing dissolved organic contaminants from a saturated soil region 112 through the reactor 20 of this invention in a manner similar to that described for the embodiment of FIG. 1, in which the fluid is a vapor phase drawn through the reactor 20 using a vapor extraction technique. In also a similar manner, microbes, nutrients, oxygen and moisture concentrations, as well as temperature and other conditions within the reactor 20 are controlled to biologically treat groundwater in the saturated zone 112 as done to treat vapor phase contaminants in the unsaturated zone 12 represented in FIG. 1. In addition, a biosparging (BSp) technique, in which air is injected below the water table 112a, or groundwater pumping that temporarily dewaters the interior of the well 10, can be employed to produce a condition where air, vapor and groundwater are all drawn through the reactor 20 simultaneously. Consequently, the ability to biodegrade contaminants under mixed-phase flow conditions is encompassed by this invention.

From the above, it can be appreciated that a significant advantage of this invention is that the reactor 20 makes possible a highly practical in situ treatment method by which contaminated sites can be bioremediated with microbes, such that hazardous wastes in any appreciable quantity are never discharged above ground. As such, air and groundwater treatment permits required to perform conventional vapor extraction and dewatering remediation techniques are unnecessary in the practice of this invention. Furthermore, the reactor 20 is employed below ground, and therefore avoids the requirement for the aboveground treatment equipment necessitated by conventional vapor extraction and dewatering remediation. These advantages significantly minimize the cost to remediate a contaminated site as a result of lower capital investment, fees and maintenance costs.

Another advantage attributable to the reactor 20 of this invention is that improved control and efficiency of the bioremediation process are made possible. For example, the present invention is not limited to the microbial species and population already present in the contaminated soil, but permits the selective introduction of additional microbes, as well as the use of different microbe species including genetically-engineered microbes, such that the biodegradation process can be optimized for the particular soil, contaminants and environmental conditions. Because a microbial population utilized within the apparatus of this invention is physically restrained within the reactor, environmental restrictions directed to the introduction of microbe species into the earth are not applicable. Furthermore, the reactor 20 enables the microbial population to be protected and nurtured, so as to further optimize the bioremediation process. For example, the reactor 20 enables nutrients to be provided directly to the microbe population, while simultaneously protecting the population from predatory, competitive or inhibitory microorganisms within the soil.

While this invention has been described in terms of a preferred embodiment, it is apparent that other forms could be adopted by one skilled in the art. For example, the construction of the well and reactor could differ significantly from that shown, and materials and microbes other than those noted could be employed. Accordingly, the scope of this invention is to be limited only by the following claims.

What is claimed is:

1. An apparatus for use in removing a contaminant from a subsurface region of earth, the apparatus comprising:
   a well having an upper end exposed to a surface of the earth and a lower end disposed in the subsurface region;
   means disposed in the well for permitting entry of a fluid into the well from the subsurface region;
   a reactor disposed in the well and comprising a porous mass pervious to the fluid, microbes capable of biodegrading the contaminant to yield a byproduct being dispersed and physically retained within the porous mass so as to inhibit the microbes from exiting the reactor; and
   means for routing flow of the fluid from the entry means and through the reactor.

2. An apparatus as recited in claim 1 wherein the contaminant and the fluid are in a liquid phase.

3. An apparatus as recited in claim 1 wherein the contaminant and the fluid are in a vapor phase.

4. An apparatus as recited in claim 1 wherein the fluid is a liquid in which the contaminant is dissolved.

5. An apparatus as recited in claim 1 wherein the subsurface region is saturated with the fluid.

6. An apparatus as recited in claim 1 wherein the routing means comprises a seal circumscribing the reactor so as to prevent the fluid from bypassing the reactor.

7. An apparatus as recited in claim 1 further comprising means for sensing temperature and moisture levels within the reactor.

8. An apparatus as recited in claim 1 further comprising means for introducing one or more substances to the reactor, the one or more substances being chosen from the group consisting of microbes, microbe nutrients, moisture and oxygen.

9. An apparatus for removing a contaminant from a subsurface region of earth, the apparatus comprising:
   a well having an upper end exposed to a surface of the earth and a lower end disposed in the subsurface region;
   means disposed at the lower end of the well for permitting entry of a fluid into the well from the subsurface region;
   a reactor disposed in the well above the entry means, the reactor comprising an inlet at a lower end thereof, the reactor containing a porous mass pervious to the fluid, microbes capable of biodegrading the contaminant to form a bioremediation byproduct being dispersed and physically retained within the porous mass so as to inhibit the microbes from exiting the reactor;
   means disposed between the reactor and an interior surface of the well for routing flow of the fluid from the entry means and through the inlet of the reactor;
   means for removing the bioremediation byproduct from the reactor; and
   means for introducing microbes and at least one other substance into the reactor from the surface of the earth.

10. An apparatus as recited in claim 9 wherein the fluid is a liquid comprising the contaminant, the subsurface region being saturated with the fluid.

11. An apparatus as recited in claim 9 wherein the fluid is a vapor comprising the contaminant.

12. An apparatus as recited in claim 9 wherein the routing means comprises an inflatable seal circumscribing the reactor and engaging an interior surface of the well.

13. An apparatus as recited in claim 9 further comprising means for sensing temperature and moisture levels within the reactor.

14. An apparatus as recited in claim 9 wherein the at least one other substance is chosen from the group consisting of microbe nutrients, moisture and oxygen.

15. A method for removing a contaminant from a subsurface region of earth, the method comprising the steps of:
   providing a well having an upper end exposed to a surface of the earth and a lower end disposed in the subsurface region, the well having means for permitting entry of a fluid into the well from the subsurface region;
   positioning a reactor in the well, the reactor comprising a porous mass pervious to the fluid, a population of microbes capable of biodegrading the contaminant being dispersed and physically retained within the porous mass so as to inhibit the microbes from exiting the reactor;
   causing the fluid to flow from the subsurface region through the entry means into the well, and thereafter through the reactor and the porous mass so as to enable the microbes to biodegrade the contaminant within the fluid to form a byproduct;
   removing the byproduct from the reactor; and
   introducing microbes into the reactor from the surface of the earth.

16. A method as recited in claim 15 wherein the contaminant and the fluid are in a liquid phase, and wherein the subsurface region is saturated with the fluid.

17. A method as recited in claim 15 wherein the contaminant and the fluid are in a vapor phase.

18. A method as recited in claim 15 wherein the fluid is a liquid in which the contaminant is dissolved, and wherein the subsurface region is saturated with the fluid.

19. A method as recited in claim 15 further comprising the step of continuously sustaining the population of microbes within the reactor by protecting the population from predatory, competitive, and inhibitory microorganisms within the subsurface region.

20. A method as recited in claim 15 further comprising the step of introducing into the reactor one or more substances chosen from the group consisting of microbe nutrients, moisture, microbe species other than those present in the subsurface region, genetically-engineered microbes, trace metals, vitamins in gaseous or liquid forms that improve biological degradation rates, oxygen, and electron acceptors.

* * * * *